United States Patent [19]

Wang

[11] Patent Number: 5,280,619
[45] Date of Patent: Jan. 18, 1994

[54] SYSTEM FOR ACCESSING SHARED DATA USING A SERIALIZATION GRAPH CONSTRUCTED FROM A HISTORY FILE SHOWING COMPLETED LOCKING DEPENDENCIES BETWEEN TRANSACTIONS

[75] Inventor: Chung C. Wang, Dallas, Tex.

[73] Assignee: Texas Instruments Incorporated, Dallas, Tex.

[21] Appl. No.: 524,775

[22] Filed: May 17, 1990

[51] Int. Cl.⁵ .................. G06F 9/00; G06F 12/00
[52] U.S. Cl. .................. 395/725; 395/600; 395/650; 395/425; 364/948.3; 364/228.1; 364/246.8; 364/DIG. 1
[58] Field of Search .............. 395/725, 600, 275, 650, 395/425

[56] References Cited

U.S. PATENT DOCUMENTS

| | | | |
|---|---|---|---|
| 3,683,418 | 8/1972 | Martin | 364/200 X |
| 3,827,029 | 7/1974 | Schlotterer et al. | 364/200 |
| 4,189,771 | 2/1980 | Roerer | 364/300 |
| 4,224,664 | 9/1980 | Trinchieri | 364/200 |
| 4,809,168 | 2/1989 | Hennessy et al. | 364/200 |
| 5,095,421 | 3/1992 | Freund | 395/650 |
| 5,161,227 | 11/1992 | Dias et al. | 395/650 |
| 5,202,987 | 4/1993 | Buyer et al. | 395/650 |
| 5,208,914 | 5/1993 | Wilson et al. | 395/275 |

OTHER PUBLICATIONS

H. Korth and A. Silberschatz Database System Concepts Z/e McGraw-Hill pp. 365'407, 1991, 1986.

*Primary Examiner*—Thomas C. Lee
*Assistant Examiner*—Peter Y. Wang
*Attorney, Agent, or Firm*—W. Daniel Swayze; Leo N. Heiting; Richard L. Donaldson

[57] ABSTRACT

Apparatus for scheduling at least two concurrent transactions accessing a shared data is provided. When a lock request is granted, the apparatus provides for constructing a history file for the shared data to show each data accessing transaction, and also provides for constructing a serialization graph with each node denoting an active transaction, and each directed edge denoting a dependency between two transactions. The serialization graph is searched for a cycle formed by transactions, and if any is found, the transactions are aborted and restarted.

28 Claims, 1 Drawing Sheet

SYSTEM FOR ACCESSING SHARED DATA USING A SERIALIZATION GRAPH CONSTRUCTED FROM A HISTORY FILE SHOWING COMPLETED LOCKING DEPENDENCIES BETWEEN TRANSACTIONS

TECHNICAL FIELD OF THE INVENTION

This invention relates generally to the field of database concurrency control, and more particularly to an apparatus and method for accessing shared data.

BACKGROUND OF THE INVENTION

Computer programs are widely used by businesses to access databases for performing business transactions, such as making a savings account deposit or a withdrawal, reserve or purchase an airline ticket, buy or sell a security, etc. Each of these business transactions rely on the integrity of the data in the databases, i.e. the balance in the savings account must reflect the correct amount after the deposit or withdrawal. However, the databases described in the business transactions above are generally accessed and modified by multiple concurrently run computer programs. These concurrently run programs interleave their access to databases, which may result in one program's database access interfering with another program's access to the same database. Such interferences may result in erroneous data in the databases.

Protocols exist presently to avoid such database errors caused by interfering programs. One such protocol is a static two-phase locking scheme. In a transaction including a plurality of steps, for example, some steps access at least one data item in a database. The static two-phase locking scheme would provide for "locking" all the data items to be accessed, before any step in the transaction is performed, to prevent any other transactions from accessing and altering the data items. The data items are "unlocked" immediately following the last step of the transaction.

A similar protocol, dynamic two-phase locking scheme, locks each data item to be accessed by the transaction immediately prior to each accessing step, and then releases the locks on all the data items immediately following the last step of the transaction.

Both the static and dynamic two-phase locking scheme exhibit a first phase, during which locks are acquired on required data items, and a second phase, during which all the locks are released. By locking the data items, a form of scheduling is achieved, since only the programs that have locked all of their required data items are executed to completion. Other programs which have not acquired locks on all of their data items, because at least one is locked by another program, must wait. In other words, the locking scheme in effect puts concurrently run programs in serial execution form.

A problem arising from the two-phase locking scheme is the reduction in program execution throughput. For example, if access of data item A is required by transactions X and Y, and transaction X has a lock on data item A. Since the lock on data item A will not be released until the completion of the very last step of transaction X, transaction Y must wait until the end of transaction X even though the transaction X step associated with data item A may have long been completed. Therefore, from the foregoing it may be seen that the concurrency of the programs is not fully exploited to achieve high throughput when two-phase locking is employed.

There often exists one data item that every transaction must access, such as a history database that records all transactions. By using the two-phase locking scheme, a bottleneck or hot spot is created at that data item, since every transaction must wait for the transaction that currently has the lock on that data item to complete. Therefore, hot spot detection and special handling are needed in a two-phase locking scheme, so that the blocked transactions do not need to wait the entire duration of the transaction which currently has a lock on the hot data item.

Another protocol used to serialize database transactions is the tree and path protocol. In the tree and path protocols, the data items must be accessed following an inherent and specific sequence. The predictable access behavior is exploited by the tree and path protocols to serialize data item access. A data item in a tree or path structure may be locked and accessed, and the data item following it in sequence is then locked before releasing the lock on the previous data item. Although the tree and path protocols are not two-phased, and therefore do not have the reduced throughput problem described above, these protocols are only applicable to those databases which are accessible only in a predetermined order. Therefore, the tree and path protocols are ineffective for data items which do not have an inherent access order.

Accordingly, a need has arisen for a locking scheme that more fully exploits the concurrency of multiple transactions to increase throughput, and which does not rely on the inherent order of the data.

SUMMARY OF THE INVENTION

In accordance with the present invention, apparatus and method for accessing shared data is provided which substantially eliminates or reduces disadvantages and problems associated with prior such apparatus and methods.

In one aspect of the present invention, apparatus for scheduling at least two concurrent transactions accessing a shared data is provided. The apparatus provides for constructing a history file for the shared data to show each data accessing transaction and also provides for constructing a serialization graph with each node denoting an active transaction and each directed edge denoting a dependency between two transactions. The serialization graph is searched for a cycle formed by transactions, and if found, such transactions are aborted and restarted.

In another aspect of the present invention, a method for scheduling at least two concurrent transactions that access a shared data is provided. The method comprises forming a history file associated with the shared data that lists each accessing transaction. A serialization graph is constructed from the history file which shows the dependencies between the transactions, if any exists. Subsequently, the serialization graph is searched to determine whether a cycle exists therein, and if one does, the transactions forming the cycle are aborted.

An important technical advantage provided by the present invention is the increased concurrency and throughput of transactions which access shared data.

Another important technical advantage of the present invention provides for serializable scheduling the execution of transactions without relying on the inherent access order of the data, and is therefore applicable to any shared data.

Yet another important technical advantage of the present invention is the ability to permit each transaction to specify the type of locking scheme desired, whether it be optimistic or pessimistic.

Further important technical advantages provided by the present invention may be obtained by a study of the specification, the drawings and the claims.

BRIEF DESCRIPTION OF THE DRAWINGS

For a better understanding of the present invention, reference may be made to the accompanying drawings, in which.

DETAILED DESCRIPTION OF THE INVENTION

Referring to TABLE 1, three concurrently-run transactions A, B and C are shown with respective transaction steps. A transaction may be defined as an execution of a program that accesses a shared database. Additionally, a database may be defined as a collection of data items, where each data item has a value. Typically, transactions may alter the value of the data items in a database by writing another value in its place. At the end of the program execution, a commit or abort step is executed. The commit step indicates that the program has terminated normally and all of its effects should be made permanent. On the other hand, the abort step indicates that the transaction has terminated abnormally, due to a number of reasons, and all of its effects should be obliterated.

Transaction A, shown in the leftmost column, has three sequential steps of locking a data item x, writing a value to data item x and then freeing the lock on data item x.

Subsequently, transaction B, shown in the center column, also locks data item x and locks a second data item y prior to reading the value of data item x and writing to data item y. Transaction B then releases the locks on data items x and y.

Transaction C, shown in the rightmost column, accesses data items y, x and z. Transaction C begins by locking data items y, x and z and then reads the value of data items y and x and writes to data item z. The locks on data items y, x, and z are then released.

TABLE 1

| A | B | C |
|---|---|---|
| lock (x) | ... | ... |
| write (x) | ... | |
| free (x) | ... | |
| | lock (x) | ... |
| | lock (y) | |
| ... | read (x) | |
| | write (y) | |
| ... | free (x) | ... |
| | free (y) | |
| ... | | lock (y) |
| ... | | lock (x) |
| | | lock (z) |
| ... | | read (y) |
| | | read (x) |
| ... | | write (z) |
| | | free (y) |
| ... | | free (x) |

TABLE 1-continued

| A | B | C |
|---|---|---|
| | | free (z) |
| Commit | | ... |
| | Commit | |
| | | Commit |

TABLE 2

| x | Read | Write |
|---|---|---|
| | | A |
| | B | |
| | C | |

TABLE 3

| y | Read | Write |
|---|---|---|
| | | B |
| | C | |

TABLE 4

| z | Read | Write |
|---|---|---|
| | | C |

TABLE 2 tabularizes each of the transactions that act on data item x. It shows, in sequential order, transaction A writing to data item x, followed by transactions B and C reading data item x. TABLE 2 may represent a history file associated with data item x that maintains a list of active transactions as each locks data item x and frees it, but has not yet committed or aborted. As each transaction is committed or aborted, its corresponding entry in the history file is deleted.

Similarly, TABLE 3 shows the current active transactions associated with data item y. As indicated in TABLE 1, transaction B wrote data item y and transaction C subsequently read data item y. TABLE 4 representing a history file for data item z shows that transaction C is currently active and has written to data item z.

Figure 1:
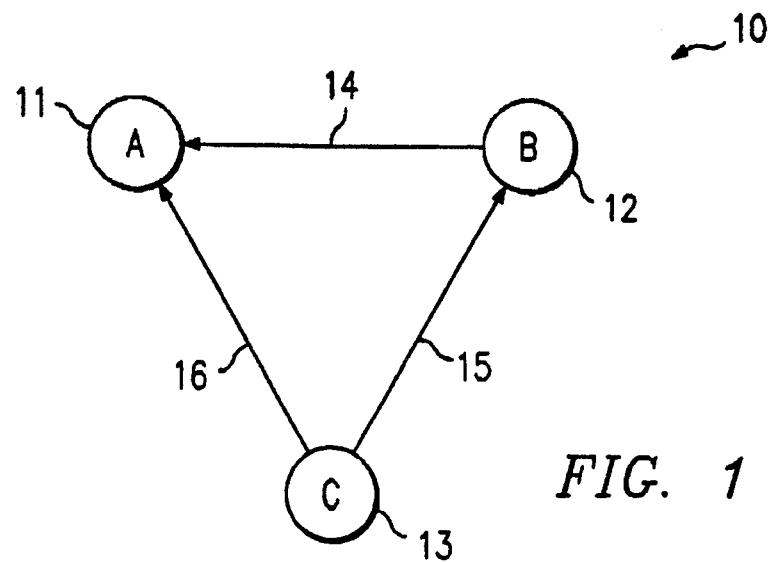
FIG. 1 is an acyclic transaction serialization graph.

From the history files associated with each data item x, y and z, a transaction serialization graph may be constructed to show the dependencies, if any, between transactions A, B and C. Referring to FIG. 1, a transaction serialization graph 10 represents the interdependencies of the steps executed by transactions A, B and C. Transactions A, B and C are represented by nodes 11-13 in graph 10. Shown between node 11 and node 12 is a directed edge 14 from node 12 to node 11, which is indicative of a dependency of transaction B on transaction A. Transaction B is dependent on transaction A because it reads the value of data item x, which is written by transaction A. Therefore, the correctness of the step in which transaction B reads the value of data item x is dependent on whether transaction A commits or aborts. If transaction A commits, the step in transaction B that reads the value of data item x written by transaction A is correct. If transaction A aborts, the step in transaction B that reads the value of data item x will incorrectly read the value thereof and therefore transaction B should be aborted.

In a similar fashion, transaction C is dependent on transaction B, as shown by a directed edge 15 from node 13 to node 12. Referring to TABLE 3 the history file associated with data item y shows that current active transaction B writes a value to data item y, and subsequently active transaction C reads the value written by transaction B. Transaction C is also dependent on transaction A, as shown in TABLE 2, where transaction C reads the value of data item x written by transaction A. This dependency is shown by a directed edge 16 from node 13 to node 11 in transaction serialization graph 10. Although transaction C additionally writes a value to a data item z, as shown in TABLE 4, no other transaction depends on this step of transaction C, nor does this step depend on any other transaction, therefore it is not represented in transaction serialization graph 10.

As transaction serialization graph 10 is updated to show the inter-dependencies of the active transactions, it is searched for cycles. A cycle is defined in the art of graph theory as a simple path where the first and last nodes are identical. Algorithms for searching cycles in a directed graph are known in the art of computer science, for example, one is used to search for cycles in a wait-for graph in deadlock detection algorithms. Such cycle detection algorithms may be employed herein. For further details please consult reference books such as *Concurrency Control and Recovery in Database Systems* by P. A. Berstein et al. and *The Theory of Database Concurrency Control* by Christos Papadimitriou.

It is determinable by an algorithm which searches for cycles that transaction serialization graph 10 does not include a cycle, and is therefore an acyclic graph. A transaction serialization graph which does not contain a cycle then has serializable transactions. In other words, if a transaction is not part of a cycle in a transaction serialization graph and is not dependent on another active transaction, then it may commit, so that its effects may be made permanent.

Since transaction A does not depend on any other transaction, it may commit. The history file of data item x, shown in TABLE 2, is updated by deleting transaction A, since it is no longer active. Transaction serializable graph 10 is updated accordingly by deleting node 11, edge 14 and edge 16. Transaction B may now execute a commit step for its termination, since it also is not a part of a cycle and is not dependent on another active transaction. TABLES 2 and 3 are in turn updated by deleting transaction B, and node 12 and edge 15 are deleted from graph 10. Transaction C may also commit, since it satisfies the commit conditions enumerated above. Therefore, transaction C entry in the history files of data items x, y and z (TABLES 2, 3 and 4) are deleted. Graph 10 is also modified to show the commitment of transaction C.

TABLE 5

| A | B | C |
|---|---|---|
|  | ... | ... |
| lock (x) | ... |  |
| write (x) | ... | ... |
| free (x) |  |  |
|  | lock (x) | ... |
| ... | lock (y) |  |
|  | read (x) |  |
| ... | write (y) | ... |
|  | free (x) |  |
| ... | free (y) |  |
|  |  | lock (y) |
| ... |  | lock (z) |

TABLE 5-continued

| A | B | C |
|---|---|---|
|  | ... | read (y) |
| ... |  | write (z) |
|  | ... | free (y) |
|  |  | free (z) |
| lock (z) | ... |  |
| read (z) |  | ... |
| free (z) |  |  |
| ... | ↓ |  |
| ... |  | ... |
| Abort |  | ... |
|  | Abort |  |
|  |  | Abort |

TABLE 6

| x | Read | Write |
|---|------|-------|
|   |      | A     |
|   | B    |       |

TABLE 7

| y | Read | Write |
|---|------|-------|
|   |      | B     |
|   | C    |       |

TABLE 8

| z | Read | Write |
|---|------|-------|
|   |      | C     |
|   | A    |       |

Figure 2:
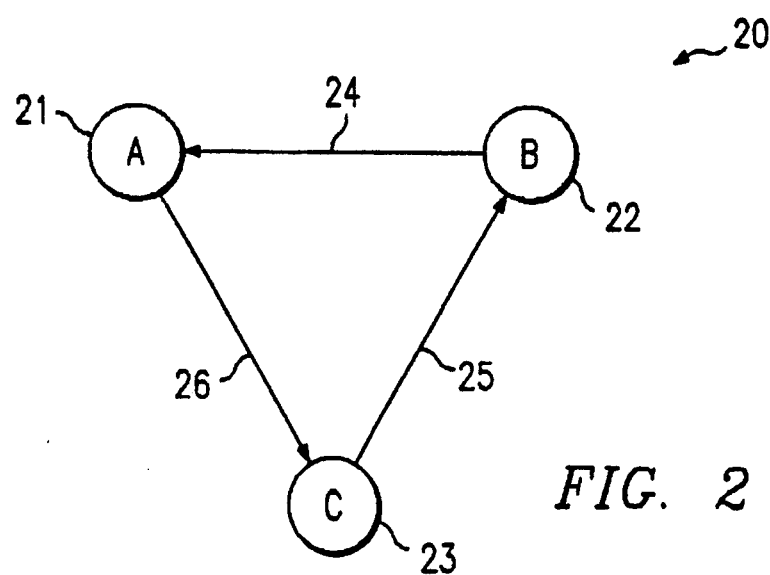
FIG. 2 is a transaction serialization graph showing a cycle.

Referring to TABLE 5, a different scenario arises. Transaction A, its steps shown in the leftmost column, locks, writes and frees data item x. This is reflected in an entry in a history file of data item x, represented by TABLE 6. Subsequently, transaction B locks data items x and y, reads data item x, writes data item y, and then frees data item x and y. Similarly, the accesses of data items x and y by transaction B are reflected in TABLES 6 and 7. Referring to FIG. 2, a second transaction serialization graph 20, showing nodes 21-23 representing transactions A, B and C, is updated with a directed edge 24 to indicate the dependency of transaction B on transaction A.

Transaction C also acquires locks on data items y and z to read data item y and write to data item z, and subsequently frees data items y and z. The requirement to read data item y creates a dependency of transaction C on transaction B, since transaction C reads data item y, the value of which is written by transaction B, as shown in table 7. Accordingly, a directed edge 25 is added to transaction serialization graph 20 from node 23 to node 22, representing transactions C and B, respectively.

Returning to TABLE 5, transaction A then locks data item z, reads the value thereof, and releases the lock on it. TABLE 8, representing a history file of data item z, shows that transaction C has written to data item z prior to transaction A's read step. Therefore, transaction A is dependent on transaction C. In transaction serialization graph 20, a third directed edge 26 is added from node 21 to node 23, showing this dependency.

As graph 20 is searched for presence of cycles, it is determined that a path exists from transaction A to transaction C, to transaction B and back to transaction A. Therefore, transaction serialization graph 20 is a cyclic graph, where a cycle of dependencies exists. Since transactions A, B and C in the cycle of graph 20 depend on each other's results, the transactions are not serializable. In order to achieve serializable execution of all transactions in a transaction serialization graph, each transaction in the cycle and its dependent transactions must be aborted and rerun. Therefore, transactions A, B and C must be aborted and restarted, as shown in TABLE 5.

In order to prevent the repeated formation of a cycle in a transaction serialization graph by the rerun transactions, the restarted transactions should employ a pessimistic locking strategy, such as the two-phase locking scheme described above. The employment of two-phase locking guarantees serializable transaction executions.

In summary, it may be viewed that by using a transaction serialization graph, each transaction releases locks on data items as soon as each data item is accessed and no longer needed. Thus inherently, no transaction is required to wait a long period of time for a lock on a data item. Those transactions which are not serializable are detected and resolved by rerunning those transactions using more conservative locking protocols. The present locking scheme enables transactions to be executed in a pipeline, serializable fashion to improve throughput. In addition, no special handling procedures are required for hot spot problems in the present locking scheme.

It is also important to note that the present invention permits the designation of each transaction as optimistic or pessimistic, where pessimistic transactions employ more conservative locking protocols. The use of path or tree protocols in structured data items is also permitted.

Cooperative transactions are another class of transactions in which a group of cooperative transactions maps a consistent database state to a new consistent state. In other words, cooperative transactions may depend on each other's intermediate steps and are therefore not serializable. However, a group of cooperative transactions may be treated as one transaction, and the group of cooperative transactions are allowed to form admissable cycles in a transaction serialization graph and are not aborted.

Although the present invention has been described in detail, it should be understood that various changes, substitutions and alterations can be made hereto without departing from the spirit and scope of the invention as defined by the appended claims.

What is claimed is:

1. Apparatus for scheduling at least two concurrent transactions accessing shared data, comprising:
   means for constructing a history file for said shared data showing the intended effect of each accessing transaction to be scheduled;
   means for constructing a serialization relationship from said history file, said serialization relationship showing completed locking dependencies between said transactions;
   means for detecting a cycle in said serialization relationship and formed by said transactions;
   means for aborting said scheduling of said transactions in response to detecting said cycle; and
   aborting said scheduling of said transactions in said cycle in response to said detection of said cycle.

2. The apparatus, as in claim 1, wherein said history file constructing means includes means for recording a type of data access.

3. The apparatus, as in claim 2, wherein said recording means includes means for recording a read access or a write access as executed in accordance with said transactions.

4. The apparatus, as in claim 1, wherein said shared data includes a plurality of data items, and said history file constructing means includes means for forming a history file for each of said plurality of data items.

5. The apparatus, as in claim 1, wherein said serialization relationship constructing means forms a node for each active transaction and a directed edge from a first node representing a first transaction to a second node representing a second transaction to show completed locking dependency of said first transaction on said second transaction.

6. The apparatus, as in claim 1, wherein said means for detecting said cycle includes means for searching for a simple path originating from a node and ending at the same node.

7. The apparatus, as in claim 1, wherein the apparatus further comprises means for employing a more conservative locking scheme for said restarted transactions than a previous locking scheme.

8. The apparatus, as set forth in claim 7, wherein said employing means employs a two-phase locking scheme for said restarted transactions.

9. The apparatus, as set forth in claim 1, wherein said aborting means aborts all transactions in said detected cycle and any transaction dependent on said transactions in said cycle.

10. The apparatus, as in claim 1, wherein said apparatus further comprises means for locking an unlocked data item and immediately unlocking said locked data item after accessing said locked data item.

11. The apparatus, as in claim 10, wherein said apparatus further comprises means for employing a more conservative locking scheme than a previous locking scheme.

12. The apparatus, as set forth in claim 11, wherein said employing means employs a two-phase locking scheme.

13. The apparatus, as set forth in claim 1, wherein at least one of said concurrent transactions corresponds to a group of cooperative transactions.

14. A method for scheduling at least two concurrent transactions accessing shared data, comprising the steps of:
   forming a history file associated with said shared data and forming each accessing transaction sequentially;
   constructing from said history file a serialization relationship including completed locking dependencies between said transactions;
   searching for a cycle in said serialization relationship;
   detecting said cycle formed by said transactions in response to said searching step; and
   aborting said transactions in said cycle and any transaction dependent therefrom after said cycle is detected.

15. The method, as set forth in claim 14, wherein said step of forming a history file includes the step of recording the type of data access.

16. The method, as set forth in claim 15, wherein said step of recording the type of data access includes the step of recording a read or a write in accordance with said transactions.

17. The method, as set forth in claim 14, wherein said shared data includes a plurality of data items, and wherein said step of forming said history file includes the step of forming a history file for each of said plurality of data items.

18. The method, as set forth in claim 14, wherein said step of constructing a serialization relationship includes the steps of:
   forming a node for each of said transactions;
   forming a directed edge from a first node to a second node to show completed locking dependency of said transaction represented by said first node on said transaction represented by said second node; and
   repeating said above two steps for each transaction.

19. The method, as set forth in claim 18, wherein said step of forming said node for each of said transaction includes the step of forming said node only for active transactions.

20. The method, as set forth in claim 14, wherein the step of searching for a cycle includes the step of searching for a simple path originating from a node and ending at the same node.

21. The method, as set forth in claim 14, further comprising the step of restarting said aborted transactions.

22. The method, as set forth in claim 21, wherein said restarting step includes the step of employing a more conservative locking scheme with respect to a previous locking scheme.

23. The method, as set forth in claim 22, wherein said step of employing a more conservative locking scheme includes the step of employing a two-phase locking scheme.

24. The method as set forth in claim 14, wherein said method further comprises the steps of: locking an unlocked data item; and immediately unlocking said locked data item after accessing said locked data item.

25. The method, as set forth in claim 24, further comprising the step of employing a more conservative locking scheme than a previous locking scheme.

26. The method, as set forth in claim 25, where said employing step employs a two-phase locking scheme.

27. A locking scheme for shared database access control of a shared database having at least two concurrent transactions to be committed, comprising the steps of:
   requesting a data item to be locked in said shared database;
   locking said data item in response to said data item being available;
   recording locking said transaction in a history file associated with said data item;
   constructing a serialization relationship from said history file;
   accessing said data item;
   releasing said locked data item immediately after said data item accessing step;
   searching said serialization relationship for the presence of a cycle after said locked data item is released; and
   committing said transaction in response to the absence of said cycle.

28. The locking scheme, as set forth in claim 27, further comprising the step of aborting any transaction forming said cycle in response to the presence of said cycle.

* * * * *